US00RE38351E

(19) United States
(12) Reissued Patent
Iseberg et al.

(10) Patent Number: US RE38,351 E
(45) Date of Reissued Patent: Dec. 16, 2003

(54) HIGH FIDELITY INSERT EARPHONES AND METHODS OF MAKING SAME

(75) Inventors: Steven J. Iseberg, Palatine, IL (US); Donald L. Wilson, Barrington, IL (US)

(73) Assignee: Etymotic Research, Inc., Elk Grove Village, IL (US)

(21) Appl. No.: 09/489,441

(22) Filed: Jan. 21, 2000

Related U.S. Patent Documents

Reissue of:
(64) Patent No.: 5,887,070
Issued: Mar. 23, 1999
Appl. No.: 08/770,647
Filed: Dec. 19, 1996

U.S. Applications:

(63) Continuation of application No. 08/597,940, filed on Feb. 7, 1996, now abandoned, which is a continuation of application No. 08/430,698, filed on Apr. 27, 1995, now abandoned, which is a continuation of application No. 07/880,244, filed on May 8, 1992, now abandoned.

(51) Int. Cl.[7] ..... H04R 25/00
(52) U.S. Cl. ..... 381/380; 381/328; 181/130
(58) Field of Search ..... 381/309, 322, 381/324, 327, 328, 325, 370, 380; 181/129, 130, 131, 135; 379/430

(56) References Cited

U.S. PATENT DOCUMENTS

| | | | |
|---|---|---|---|
| 2,430,229 | A | 11/1947 | Kelsey |
| 2,971,065 | A | 2/1961 | Busse |
| 3,408,461 | A | 10/1968 | Langford |
| 3,529,102 | A | 9/1970 | Rosenstand |
| 3,671,685 | A | 6/1972 | McCabe |
| 3,789,164 | A | 1/1974 | Ryder |
| 3,819,860 | A | 6/1974 | Miller |
| 4,170,720 | A | 10/1979 | Killion |
| 4,447,677 | A | 5/1984 | Miyahra et al. |
| 4,520,236 | A | 5/1985 | Gauthier |
| 4,592,087 | A | 5/1986 | Killion |
| 4,646,872 | A | 3/1987 | Kamon et al. |
| 4,677,675 | A | 6/1987 | Killion et al. |

(List continued on next page.)

FOREIGN PATENT DOCUMENTS

| | | |
|---|---|---|
| GB | 2155276 | 9/1985 |
| JP | 0043700 | 3/1983 |
| JP | 0238196 | 10/1986 |
| JP | 0290295 | 12/1987 |

OTHER PUBLICATIONS

Knopf Im Ohr, pp. 34, 35, Audio Jul., 1993.
Little Feat, p. 36, Audio Jul., 1993.
pp. 135, 136, Audio Jul., 1993.
M.C. Killion: "An 'Acoustically Invisible' Hearing Aid", Hearing Instruments, vol. 39, No. 10, 1988.
M.C. Killion, T.W. Tillman, "Evaluation of High–Fidelity Hearing Aids", Journal of Speech and Hearing Research, vol. 25, 15–25, Mar., 1982.
M.C. Killion and W.J. Murphy; "Smoothing the ITE Response: The BF–1743 Damped Coupling Assembly" Apr., 1981.

*Primary Examiner*—Huyen Le
(74) *Attorney, Agent, or Firm*—McAndrews, Held & Malloy, Ltd.

(57) ABSTRACT

An insert earphone is provided in which a piece of foam material is used to resiliently mount a receiver within a chamber portion of a one-piece plastic housing member. The receiver has an output port extending through a central aperture of the piece of foam material and into one end of a passage defined by a tubular portion of the housing member with a damper being disposed in the other end of the passage. The tubular portion is inserted into an ear tip or other coupling device and has an enlarged diameter end section to achieve a locking action. Two such insert earphones may be coupled through cables to a junction unit and filters are provided for enhancing the drive of the earphones at high frequencies, the filters being preferably mounted in the junction unit.

56 Claims, 5 Drawing Sheets

U.S. PATENT DOCUMENTS

| | | | |
|---|---|---|---|
| 4,677,679 | A | 6/1987 | Killion |
| 4,689,819 | A | 8/1987 | Killion |
| 4,739,512 | A | 4/1988 | Hartl et al. |
| 4,763,753 | A | 8/1988 | Killion |
| 4,781,196 | A | 11/1988 | Killion |
| 4,852,177 | A | 7/1989 | Ambrose |
| 4,852,683 | A | 8/1989 | Killion |
| 4,870,688 | A | 9/1989 | Voroba et al. |
| 5,099,856 | A | 3/1992 | Killion et al. |
| 5,113,967 | A | 5/1992 | Killion et al. |
| 5,128,566 | A | 7/1992 | Killion et al. |
| 5,131,046 | A | 7/1992 | Killion et al. |
| 5,144,675 | A | 9/1992 | Killion et al. |

HIGH FIDELITY INSERT EARPHONES AND METHODS OF MAKING SAME

Matter enclosed in heavy brackets [ ] appears in the original patent but forms no part of this reissue specification; matter printed in italics indicates the additions made by reissue.

This is a continuation of application Ser. No. 08/597,940, filed Feb. 7, 1996, now abandoned, which is a continuation of application Ser. 08/430,698, filed Apr. 27, 1995, now abandoned, which is a continuation of Ser. No. 07/880,244 filed May 8, 1992, now abandoned.

BACKGROUND OF THE INVENTION

1. Field of the Invention

This invention relates to earphones and methods of making the same to obtain earphones and earphone assemblies which reproduce sounds with very high fidelity and with minimum noise and which are suitable for use by the most discriminating listeners. The earphones and assemblies of the invention are very compact and light in weight, are highly reliable and are readily and economically manufacturable.

2. Background of the Prior Art

"Audiophile" earphones have been marketed for use by audiophiles or discriminating listeners interested in the highest possible sound reproduction. Such audiophile earphones have been ostensibly capable of effecting high fidelity sound reproduction although it has been recognized by many users as well as the makers of such earphones that they have left much to be desired with respect to fidelity of reproduction. It has apparently been assumed by such users and makers that deficiencies in quality of sound reproduction are an unavoidable result of the use of earphones.

In a separate audiometry art, earphones have also been developed and marketed in limited quantities for use in specialized audiometry applications to measure the responses of a patient's ear and having features for obtaining desired response characteristics, one disclosure being contained in the Killion U.S. Pat. No. 4,763,753, issued Aug. 16, 1988. Another separate art, the hearing aid art, also contains many disclosures related to the achievement of improved response characteristics, including a paper entitled "SMOOTHING THE ITE RESPONSE: THE BF-1743 DAMPED COUPLING ASSEMBLY" by Mead C. Killion and William J. Murphy, first published in April 1981 and revised June 1982, by Industrial Research Products, Inc. Elk Grove Village, Ill. Such disclosures in the audiometry and hearing aid art relate to devices of relatively expensive construction which are designed for specialized applications and marketed in limited quantities. The applicability of the audiometry and hearing aid arts to the making of earphones for use in high fidelity sound reproduction has apparently gone unrecognized.

SUMMARY OF THE INVENTION

This invention was evolved after learning of the deficiencies of earphones marketed for use by audiophiles and with the general object of providing earphones which have improved high fidelity response characteristics and which are readily and economically manufacturable.

Important aspects of the invention relate to the recognition and discovery of problems with prior art arrangements and their causes and to an analysis of what is necessary to overcome such problems and otherwise provide improved earphones. It was discovered that one serious problem with audiophile earphones has been related to the failure to recognize the need to compensate for loss of external-ear resonance when using an earphone and the failure to provide compensating acoustic characteristics between the ear canal of a user and the transducer or receiver used to develop an audio signal from an applied electrical signal. It was further discovered that features of a damped coupling assembly of the hearing aid disclosed in the aforementioned Killion and Murphy paper might be applied with advantage to the construction of an audiophile earphone. With a damped coupling assembly as disclosed in that paper, a damper is coupled through a tube to an output port of a receiver and is disposed within the tip of an earmold. The arrangement produces a frequency response which will compensate for the loss of external ear resonance and which is largely independent of the total length of the coupling between the receiver and the earmold tip.

In accordance with the invention, an audiophile insert earphone is provided which uses a damped coupling assembly similar to that disclosed in the above-mentioned Killion and Murphy paper and operative to provide compensation for the loss of external-ear resonance. In accordance with one important feature of the invention, a pair of such earphones are combined in a dual earphone assembly usable for stereophonic reproduction.

Additional important features of the invention relate to features of construction which facilitate manufacture of insert earphones and which at the same time achieve reproduction of sounds with very high fidelity and with a high degree of reliability. Certain of such features relate to the provision of a housing member which can be readily molded from plastic in one piece and which serves the functions of connecting to an outlet port of a receiver, supporting a damper and providing a sound passage. The housing member also serves to releasably connect to a coupling device such as an earmold or ear tip and it performs all of such functions with a high degree of accuracy and reliability. Others such features relate to the provision of a resilient support for the receiver to minimize the effects of vibrations and noise and to methods of making the earphone to facilitate manufacture at low cost.

Another feature relates to the combination of electrical filters with the earphone and its damped coupling assembly to achieve optimum overall results.

Still another feature relates to a construction to facilitate removal and replacement of a damper and to the provision of a tool for that purpose.

This invention contemplates other objects, features and advantages which will become more fully apparent from the following detailed description taken in conjunction with the accompanying drawings.

DESCRIPTION OF A PREFERRED EMBODIMENT

Figure 1:
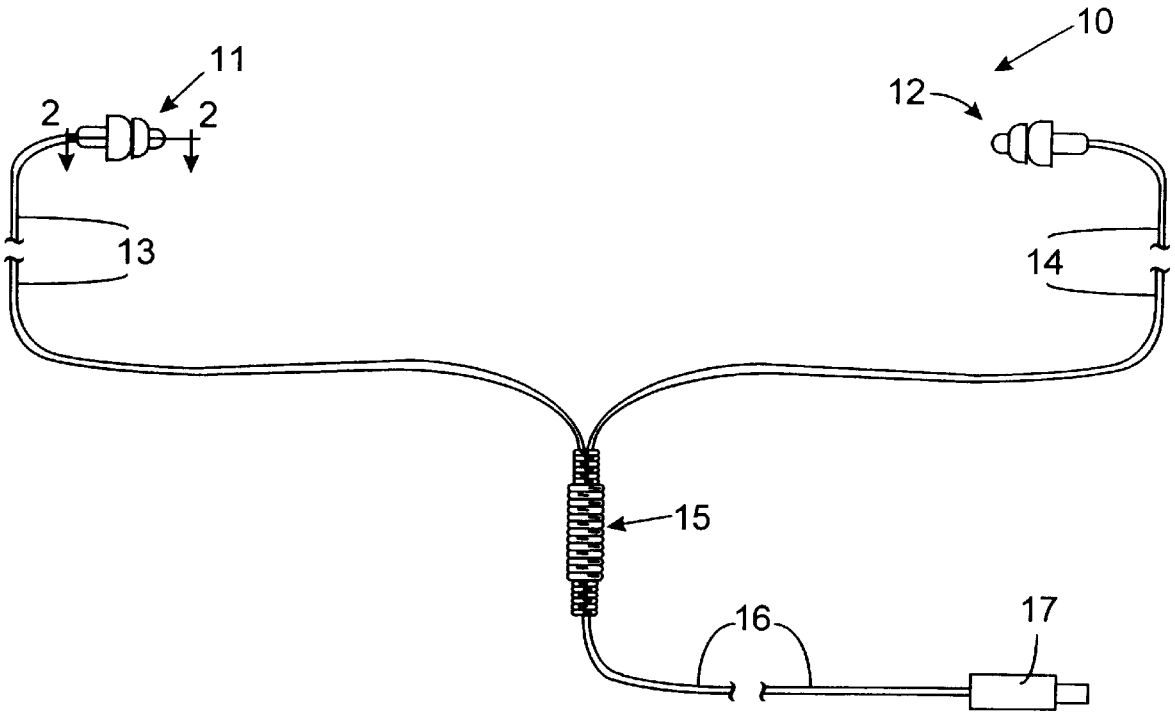
FIG. 1 illustrates a high fidelity insert earphone assembly of the invention.

In FIG. 1, reference numeral 10 generally designates an earphone assembly which is constructed in accordance with the principles of this invention and which is suitable for use by an audiophile, for example. It will be understood, however, that a number of features of the invention are not limited to any particular use. Certain features may be used, for example, in the construction of hearing aids for use by persons having a hearing impairment.

The illustrated assembly 10 includes a pair of earphones 11 and 12 for insertion into the entrances of the ear canals of a user. A pair of cables 13 and 14 connect earphones 11 and 12 to a junction unit 15 and a common cable 16 connects the junction unit 15 to a plug connector 17 which may be connected to an output jack of a stereophonic amplifier, for example.

Figure 2:
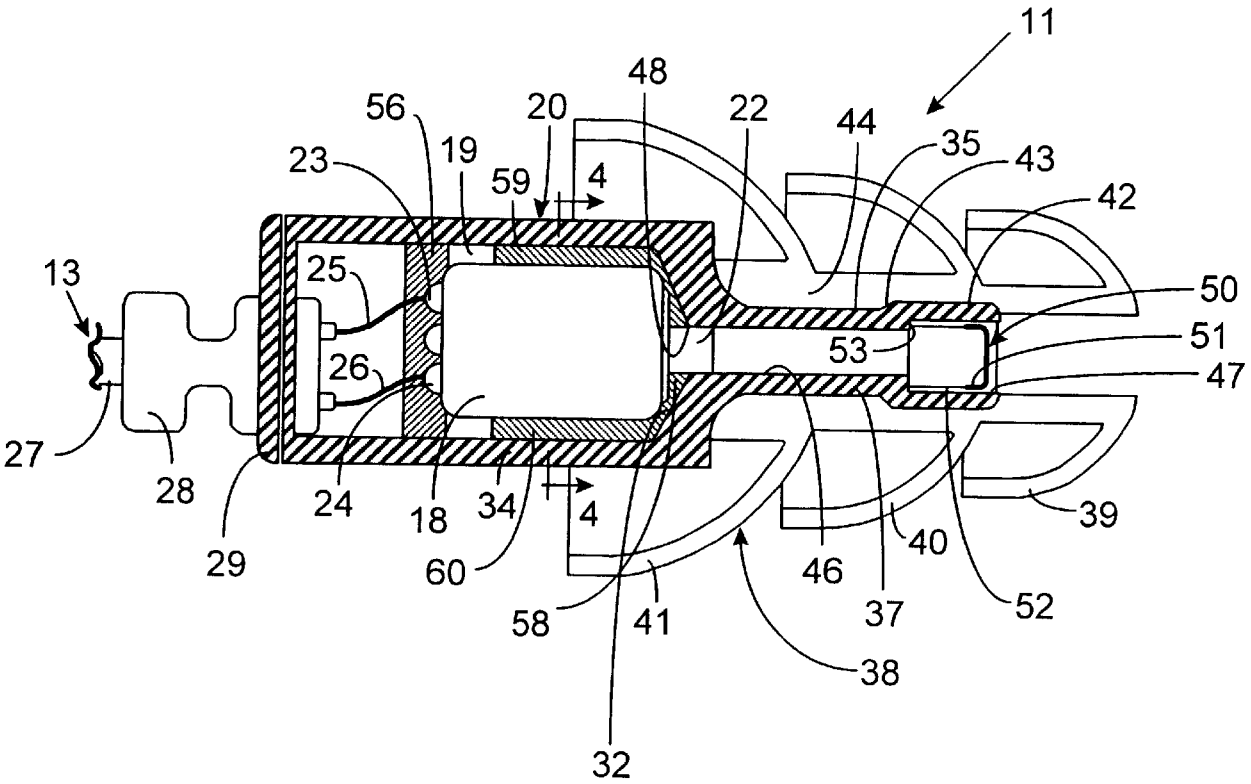
FIG. 2 is a cross-sectional view of one earphone of the assembly of FIG. 1, taken substantially along line 2—2 of FIG. 1.

FIG. 2 is a cross-sectional view of the earphone 11, the construction of the other earphone 12 being preferably identical to that of the earphone 11. The earphone 11 comprises a receiver 18 which is mounted in a chamber portion 19 of a housing member 20. The receiver 18 has an acoustic output port and has electrical input terminals 23 and 24 and is operative for generating an acoustic output signal at the output port 22 as a function of an electrical signal applied to the terminals 23 and 24. The terminals 23 and 24 are connected through wires 25 and 26 to conductors of the cable 13 and an outer sheath 27 of the cable 13 is bonded to a strain relief member 28. Member 28 is secured in an opening of an end cap 29 which is secured to one end of the housing member 20 to close one end of the chamber portion 19.

The housing member 20 includes a wall 32 at an opposite end of the chamber portion 19 and an outer wall 34 of the chamber portion 19 which is in surrounding relation to the receiver 18 and which may preferably be of generally cylindrical form.

The housing member 20 further includes a tubular portion 35 which projects from the end wall 32 of the chamber portion of the housing member and which is inserted in an opening 37 of an acoustic coupling device 38 arranged to be inserted into the entrance of an ear canal of a user. As shown, the coupling device 38 is in the form of an eartip of a soft compliant material and has three outwardly projecting flange portions 39, 40 and 41 which are of generally conical form and of progressively increasing diameters, arranged to conform to the inner surface portions of the entrance of the ear canal of the user and to provide a seal limiting transmission of sound to the ear canal.

In accordance with a releasable lock feature of the invention, an end section 42 of the tubular portion 35 is of increased cross-sectional size to provide an external shoulder 43 in facing relation to the wall 32. In assembly, a portion 44 of the compliant material of the device 38 is stretched over the end section 42 and then expands into the space between the shoulder 43 and the wall 32 as shown, so as to lock the device 38 and housing member 20 together while permitting disassembly when desired.

Custom earmolds or other types of coupling devices may be substituted for the illustrated device 38, the subassembly of the housing member 20, receiver 18 and other parts being thus usable with various types of coupling devices.

In accordance with further important features of the invention, the tubular portion 35 defines a passage 46 which has an outlet end portion 47 for propagation of acoustic energy into the earcanal of a user and an inlet end portion 48 in communication with the outlet port [20] *22* of the receiver 18. The outlet port 22 is preferably in the form of a tubular member which is fitted into the inlet end portion 47 of the passage 46 as shown. An acoustic damper 50 is fitted in the outlet end portion 47 of the passage 46 and, as illustrated, includes a cup-shaped screen member 51 secured in a cylindrical support member 52. The outlet end portion 47 preferably has an enlarged diameter to provide a shoulder 53 operative to limit movement of the damper 50 toward the receiver 18 during assembly and to accurately fix its position. As shown, the portion of the screen member 51 which is transverse to the direction of sound transmission is in recessed relation to the end of the tubular housing portion [22] *35* and the terminal end of the tubular housing portion is spaced a substantial distance from the terminal end of the coupling device, the result being that problems with wax accumulations on the screen are minimized. However, should such accumulations occur, a special removal tool as hereinafter described may be used to remove a clogged damper 50 which can then be replaced with a new damper.

With the construction as thus far described, the housing member 20 can be readily molded from plastic in one piece and it serves the functions of connecting to the outlet port of the receiver, supporting the damper, providing a sound passage and releasably connecting to a coupling device which may be of various possible types, such functions being performed with a high degree of accuracy and reliability.

Figure 4:
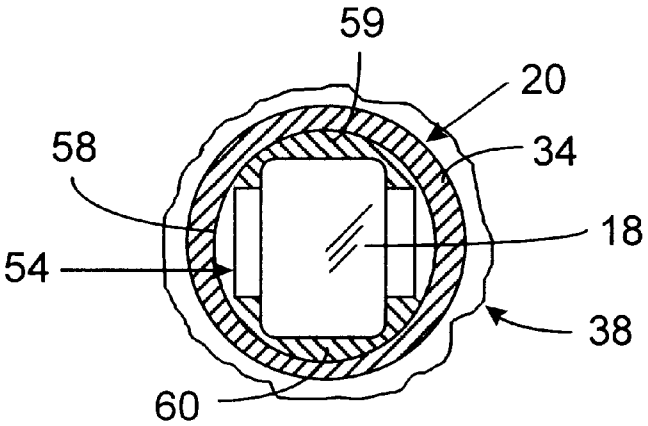
FIG. 4 is a cross-sectional view taken substantially along line 4—4 of FIG. 2.
Figure 3:
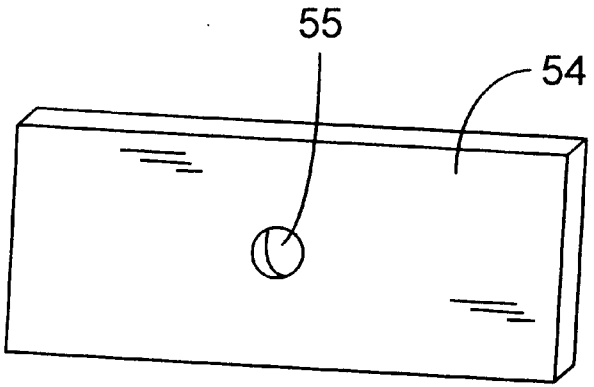
FIG. 3 shows a piece of resilient material used in construction of the earphone of FIG. 1.

Additional important features relate to the provision of a resilient support for the receiver 18 to minimize problems with noise and vibrations while facilitating assembly of the earphone. A piece of foam material 54 is provided having a generally rectangular form and a central opening 55 as depicted in FIG. 3. In assembly, strain relief member 28 at the end of the cable 13 is installed in an opening in the end cap 29 and the conductors of the cable are connected directly or through the separate wires 25 and 26 as illustrated to the terminals 23 and 24 of the receiver 18, being optionally extended through a resilient foam element 56, as shown. Then the output port 22 of the receiver is inserted in the opening 55 of the piece 54 and the receiver is inserted into the chamber portion 19 and moved toward the wall 32 to press fit the output port 22 into the inlet end portion 48 of the passage 46. During this assembly step, a portion 58 of the piece 54 is compressed between the end of the receiver 18 and the wall 32 and portions 59 and 60 of the piece 54 are folded back and compressed between the receiver and the outer wall 34 of the chamber portion 19. As shown in the cross-sectional view of FIG. 4, parts of the folded-back portions 59 and 60 extend along the sides of the receiver 18 as well as along the top and bottom of the receiver 18. This assembly step is readily and quickly performed and results in a resilient support of the receiver 18 within the housing member 20 in a manner such as to minimize transmission of noise and vibrations thereto, functioning with a high degree of reliability. It also results in an acoustic seal between the output port 22 and the inlet end 48 of passage 46. As a final assembly step, an epoxy or equivalent bonding means is used to secure the end cap 29 to the end of the housing member 20.

Figure 5:
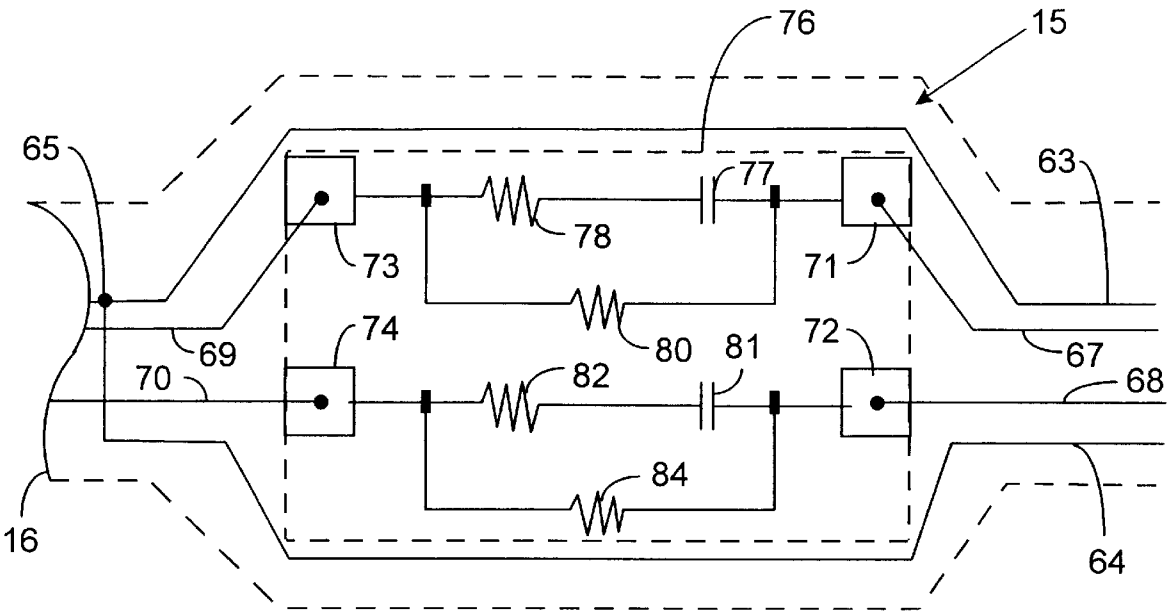
FIG. 5 is a circuit diagram of a electrical filter unit of the assembly of FIG. 1.

FIG. 5 is a schematic diagram of the configuration of the junction unit 15 which connects the earphone cables 13 and 14 to the common cable 16 and which includes special electrical filters for enhancing the performance of the earphones 11 and 13. One conductor 63 and one conductor 64 of the cables 13 and 14 are directly connected to a ground conductor 65 of the common cable 16. A second conductor 67 of the cable 13, a second conductor 68 of the cable 14, and conductors 69 and 70 of cable 16 are respectively connected to pads 71, 72, 73 and 74 of a circuit board 76 which is formed with two circuits operative to increase the signal applied to the receivers of the earphones 11 and 12 as a function of increasing frequency.

As shown, a capacitor 77 and a resistor 78 are connected in series between pads 71 and 73 while a resistor 80 is connected directly between pads 71 and 73, in parallel with the series combination of capacitor 77 and resistor 78. Similarly, a capacitor 81 and a resistor 82 are connected in series between pads 72 and 74 while a resistor 84 is connected directly between pads 71 and 73. It will be apparent that at very low frequencies, when the capacitive reactance is high, the series impedances are determined primarily by the value of the resistors 80 and 84. As the frequency increases, the series impedances are reduced, increasing the amplitudes of higher frequency components of the applied signals.

This electrical filtering operation is found to be highly desirable, permitting the use of an amount of acoustic damping sufficient to smooth out peaks in the acoustic responses of the earphones 11 and 12 while obtaining optimum frequency response characteristics. By way of example, the value of each of the resistors 78, 80, 82 and 84 may be 100 ohms and the value of each of the capacitors 77 and 81 may be 0.22 microfarads. The circuit board 76 and the parts thereon preferably have quite small dimensions. Each of the resistor and capacitor parts preferably has maximum dimensions of 0.150"×0.300"×0.100". These dimensions are desirable to obtain a compact junction unit and are such that if desired, as when a single earphone is to be used, the filter for each filter might be located within the earphone, e.g. between the receiver 18 and the end cap 29. In a two earphone assembly such as the illustrated assembly 10, however, it is generally preferable to locate the filters in the junction unit 15.

Figure 6:
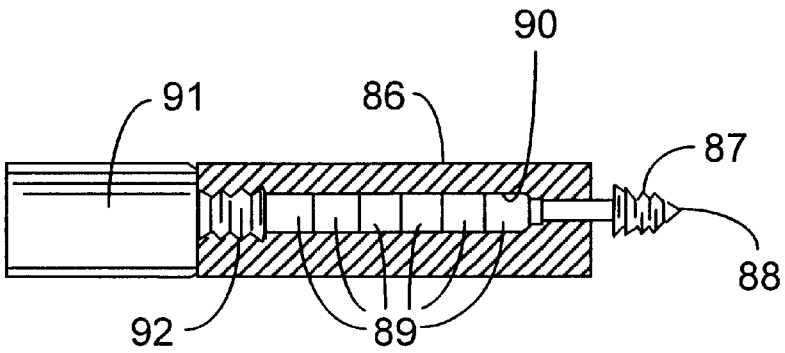
FIG. 6 is a side elevational view, partly in section, illustrating a device usable for removal of dampers of the earphones of the invention.

FIG. 6 illustrates a tool usable for removal and replacement of a damper which has become clogged with wax or otherwise defective. A support rod 86 carries a threaded element 87 which has a pointed end 88 to be pushed into the screen of a defective damper while the rod 86 is rotated to engage the threads of the element 87 with a lip of the cylindrical support 52 of the damper 50; the rod 86 being then retracted to withdraw the defective damper. Replacement dampers 89 may be contained in a chamber 90 within the support rod 86 and may be accessed by removal of an extension 91 of the rod 86, the extension 91 having a reduced diameter threaded end portion 92 which is screwed into an internally threaded end portion of the replacement damper chamber 90.

*Aspects of the present invention described above enable an insert earphone that provides high fidelity sound reproduction, without requiring a long flexible tube between a hollow elongated tubular portion of the insert earphone housing and a resilient sealing member that seals with the ear canal of a wearer.*

It will be understood that modifications and variations may be effected without departing from the spirit and scope of the novel concepts of this invention.

What is claimed is:

1. An insert earphone comprising:

a unitary housing having a hollow body portion, the hollow body portion having an end wall and an open end disposed opposite the end [wall] *wall,* and a hollow elongated tubular portion extending from the end wall;

an end cap;

a cable including a plurality of electrical conductors extending from an electrical audio signal source external to the housing, the cable being secured with the end cap, the end cap connected to cover the open end of the hollow body portion;

a receiver for transducing electrical energy received along the plurality of electrical conductors to sound energy, the receiver being supported within the hollow body portion of the housing and having a sound outlet port extending partially into the hollow elongated tubular portion of the housing in a closely conforming manner;

an insert formed from a resilient material, the insert being disposed between the receiver and at least one interior wall of the unitary housing to inhibit movement of the receiver within the hollow body portion and assisting to provide an acoustic seal between the hollow body portion and the elongated tubular portion;

a damper supported within the hollow elongated tubular portion of the housing at a position opposite the sound outlet port of the receiver, sound from the sound outlet port of the receiver being conducted to the damper by the hollow elongated tubular portion;

a resilient sealing member disposed over the hollow elongated tubular portion for sealing with an ear canal of a wearer; *and* the earphone extending into and substantially acoustically sealing the ear canal of the wearer when inserted, the damper and receiver response compensating for loss of external ear resonance and coupling resonance that otherwise would occur when the insert earphone is inserted into the ear canal of the wearer to thereby assist in providing a high fidelity response.

2. An insert earphone comprising:

a unitary housing having a hollow body portion, the hollow body portion having an end wall, at least one interior wall, and an open end disposed opposite the end wall, and a hollow elongated tubular portion extending from the end wall;

a receiver for transducing electrical energy received into sound energy, the receiver having a sound outlet port extending from an end thereof;

an insert formed of resilient material, the insert having a substantially central opening therein; and wherein, during assembly, the outlet port of the receiver is placed in the opening of the insert and the receiver and insert are inserted as a unit into the open end of the hollow body portion until the outlet port engages and extends partially into the hollow elongated tubular portion such that a portion of the insert is compressed between the end of the receiver and the end wall, and other portions of the insert are compressed between the receiver and the at least one interior wall, thereby mounting the receiver within the hollow body portion and assisting to provide an acoustic seal between the hollow body portion and the elongated tubular portion while providing for transmission of sound energy from the sound outlet port through the hollow elongated tubular portion into the ear canal of a wearer.

3. A high-fidelity insert earphone comprising:

a unitary housing having a hollow body portion, the hollow body portion having an end wall, and a hollow elongated tubular portion extending from the end wall;

a receiver for transducing electrical energy received into sound energy, the receiver having a sound outlet port extending from an end thereof, the sound outlet port having a first end and a second end; and an insert formed from a resilient material, the insert being disposed between the end of the receiver and the end wall and flanking [on] *only* the second end of the sound outlet port, the first end of the sound outlet port mating with, directly contacting a surface of, and extending into the hollow elongated tubular portion.

4. The high fidelity insert earphone of claim 3 wherein the insert mounts and inhibits movement of the receiver within the hollow body portion of the unitary housing.

5. The high-fidelity insert earphone of claim 3 further comprising a damper supported within the hollow elongated tubular portion of the housing at a position opposite the sound outlet port of the receiver, sound from the sound outlet port of the receiver being conducted to the damper by the hollow elongated tubular portion.

6. The high-fidelity insert earphone of claim 5 further comprising a resilient sealing member disposed over the hollow elongated tubular portion for sealing with an ear canal of a wearer.

7. The high fidelity insert earphone of claim 6 wherein the earphone extends into and substantially acoustically seals the ear canal of a wearer.

8. The high fidelity insert earphone of claim 7 wherein the earphone emulates a human ear's natural diffuse field response to sound energy received.

9. The high fidelity insert earphone of claim 6 wherein the resilient sealing member has a plurality of outwardly projecting flange portions of generally conical form and of progressively increasing diameters.

10. The high fidelity insert earphone of claim 9 wherein the earphone extends into and substantially acoustically seals the ear canal of a wearer.

11. The high fidelity insert earphone of claim 10 wherein the earphone emulates a human ear's natural diffuse field response to sound energy received.

12. An insert earphone comprising:

a receiver for transducing electrical energy received into sound energy, the receiver having a sound outlet port extending from an end thereof, the sound outlet port having a first end and a second end, the receiver having a radial dimension and at least one outer surface;

an insert formed from a resilient material, and having an uncompressed thickness; and a unitary housing having a hollow body portion, the hollow body portion having at least one inner surface, a radial dimension, and an end wall, and a hollow elongated tubular portion extending from the end wall, the radial dimension of at least a portion of hollow body portion being less than the sum of the radial dimension of the receiver and the uncompressed thickness of the insert, and upon assembly, a first portion of the insert being disposed and compressed between the end of the receiver and the end wall, second and third portions of the insert being disposed and compressed between the at least one outer surface of the receiver and the at least one inner surface of the hollow body portion, the first end of the sound outlet port directly contacting a surface of the hollow elongated tubular portion and extending into the hollow elongated tubular portion, and only the second end of the sound outlet port being flanked by the insert, the insert thereby mounting the receiver in the hollow body portion and assisting to provide an acoustic seal between the hollow body portion and the elongated tubular portion of the housing.

13. A method of assembling an insert earphone comprising a receiver having a sound outlet port extending from an end thereof, a unitary housing having a hollow body portion, the hollow body portion having an end wall and an open end disposed opposite the end wall, and a hollow elongated tubular portion, and a resilient insert having a substantially central opening therein, the method comprising the steps of:

placing the sound outlet port of the receiver through the opening of the resilient insert;

inserting the receiver, sound outlet port first, and the resilient insert as a unit into the open end of the hollow body portion;

moving the inserted receiver toward the end wall such that first and second portions of the resilient insert are folded back in a direction toward the open end and compressed between the receiver and at least one inner surface of the hollow body portion; and matings engaging the sound outlet port of the receiver with the hollow elongated tubular portion such that a third portion of the resilient insert is compressed between the end of the receiver and the end wall.

14. The method of claim 13 further comprising the step of operatively coupling an electrical energy source to the receiver.

15. The method of claim 14 wherein the insert earphone further comprises an end cap, and further comprising the step of securing the end cap to the open end of the hollow body portion.

*16. An insert earphone comprising:*

*a housing having a hollow body portion, the hollow body portion having an end wall and an open end disposed opposite the end wall, and a hollow elongated tubular portion extending from the end wall;*

*an end cap;*

*a cable including a plurality of electrical conductors extending from an electrical audio signal source external to the housing, the cable being secured with the end cap, the end cap connected to cover the open end of the hollow body portion;*

*a receiver for transducing electrical energy received along the plurality of electrical conductors to sound energy, the receiver being supported within the hollow body portion of the housing and having a sound outlet port extending partially into the hollow elongated tubular portion of the housing in a closely conforming manner;*

*an insert formed from a resilient material, the insert being disposed between the receiver and at least one interior wall of the housing to inhibit movement of the receiver within the hollow body portion and assisting to provide an acoustic seal between the hollow body portion and the elongated tubular portion;*

*a damper supported within the hollow elongated tubular portion of the housing at a position opposite the sound outlet port of the receiver, sound from the sound outlet port of the receiver being conducted to the damper by the hollow elongated tubular portion;*

*a resilient sealing member disposed over the hollow elongated tubular portion for sealing with an ear canal of a wearer; and*

*the earphone extending into and substantially acoustically sealing the ear canal of the wearer when inserted, the damper and receiver response compensating for loss of external ear resonance and coupling resonance that otherwise would occur when the insert earphone is inserted into the ear canal of the wearer to thereby assist in providing a high fidelity response.*

*17. An insert earphone comprising:*

*a housing having a hollow body portion, the hollow body portion having an end wall, at least one interior wall, and an open end disposed opposite the end wall, and a hollow elongated tubular portion extending from the end wall;*

*a receiver for transducing electrical energy received into sound energy, the receiver having a sound outlet port extending from an end thereof;*

*an insert formed from a resilient material, the insert having a substantially central opening therein; and wherein, during assembly, the outlet port of the receiver is placed in the opening of the insert and the receiver and insert are inserted as a unit into the open end of the hollow body portion until the outlet port engages and extends partially into the hollow elongated tubular portion such that a portion of the insert is compressed between the end of the receiver and the end wall, and other portions of the insert are compressed between the receiver and the at least one interior wall, thereby mounting the receiver within the hollow body portion and assisting to provide an acoustic seal between the hollow body portion and the elongated tubular portion while providing for transmission of sound energy from the sound outlet port through the hollow elongated tubular portion into the ear canal of a wearer.*

*18. A high-fidelity insert earphone comprising:*

*a housing having a hollow body portion, the hollow body portion having an end wall, and a hollow elongated tubular portion extending from the end wall;*

*a receiver for transducing electrical energy received into sound energy, the receiver having a sound outlet port extending from an end thereof, the sound outlet port having a first end and a second end; and*

*an insert formed from a resilient material, the insert being disposed between the end of the receiver and the end wall and flanking only the second end of the sound outlet port, the first end of the sound outlet port mating with, directly contacting a surface of, and extending into the hollow elongated tubular portion.*

*19. The high fidelity insert earphone of claim 18 wherein the insert mounts and inhibits movement of the receiver within the hollow body portion of the housing.*

*20. The high-fidelity insert earphone of claim 18 further comprising a damper supported within the hollow elongated tubular portion of the housing at a position opposite the sound outlet port of the receiver, sound from the sound outlet port of the receiver being conducted to the damper by the hollow elongated tubular portion.*

*21. The high-fidelity insert earphone of claim 20 further comprising a resilient sealing member disposed over the hollow elongated tubular portion for sealing with an ear canal of a wearer.*

*22. The high fidelity insert earphone of claim 21 wherein the earphone extends into and substantially acoustically seals the ear canal of a wearer.*

*23. The high fidelity insert earphone of claim 22 wherein the earphone emulates a human ear's natural diffuse field response to sound energy received.*

*24. The high fidelity insert earphone of claim 21 wherein the resilient sealing member has a plurality of outwardly projecting flange portions of generally conical form and of progressively increasing diameters.*

*25. The high fidelity insert earphone of claim 24 wherein the earphone extends into and substantially acoustically seals the ear canal of a wearer.*

*26. The high fidelity insert earphone of claim 25 wherein the earphone emulates a human ear's natural diffuse field response to sound energy received.*

*27. An insert earphone comprising:*

*a receiver for transducing electrical energy received into sound energy, the receiver having a sound outlet port extending from an end thereof, the sound outlet port having a first end and a second end, the receiver having a radial dimension and at least one outer surface;*

*an insert formed from a resilient material and having an uncompressed thickness; and*

*a housing having a hollow body portion, the hollow body portion having at least one inner surface, a radial dimension, and an end wall, and a hollow elongated tubular portion extending from the end wall, the radial dimension of at least a portion of hollow body portion being less than the sum of the radial dimension of the receiver and the uncompressed thickness of the insert, and upon assembly, a first portion of the insert being disposed and compressed between the end of the receiver and the end wall, second and third portions of the insert being disposed and compressed between the at least one outer surface of the receiver and the at least one inner surface of the hollow body portion, the first end of the sound outlet port directly contacting a surface of the hollow elongated tubular portion and extending into the hollow elongated tubular portion, and only the second end of the sound outlet port being flanked by the insert, the insert thereby mounting the receiver in the hollow body portion and assisting to provide an acoustic seal between the hollow body portion and the elongated tubular portion of the housing.*

*28. A method of assembling an insert earphone comprising a receiver having a sound outlet port extending from an end thereof, a housing having a hollow body portion, the hollow body portion having an end wall and an open end disposed opposite the end wall, and a hollow elongated tubular portion, and a resilient insert having a substantially central opening therein, the method comprising the steps of:*

*placing the sound outlet port of the receiver through the opening of the resilient insert;*

*inserting the receiver, sound outlet port first, and the resilient insert as a unit into the open end of the hollow body portion;*

*moving the inserted receiver toward the end wall such that first and second portions of the resilient insert are folded back in a direction toward the open end and compressed between the receiver and at least one inner surface of the hollow body portion; and*

*matingly engaging the sound outlet port of the receiver with the hollow elongated tubular portion such that a third portion of the resilient insert is compressed between the end of the receiver and the end wall.*

*29. The method of claim 28 further comprising the step of operatively coupling an electrical energy source to the receiver.*

*30. The method of claim 29 wherein the insert earphone further comprises an end cap, and further comprising the step of securing the end cap to the open end of the hollow body portion.*

*31. An insert earphone comprising:*

*a housing having a hollow body portion, the hollow body portion having an end wall and a hollow elongated tubular portion extending from the end wall;*

*a cable including a plurality of electrical conductors extending from an electrical audio signal source external to the housing;*

*a receiver electrically coupled to the plurality of electrical conductors, the receiver for transducing electrical energy received along the plurality of electrical conductors to sound energy, the receiver being supported within the hollow body portion of the housing and having a sound outlet port extending partially into the hollow elongated tubular portion of the housing in a closely conforming manner;*

*an insert formed from a resilient material, the insert being disposed between the receiver and at least one interior wall of the housing to inhibit movement of the receiver within the hollow body portion and assisting to provide an acoustic seal between the hollow body portion and the elongated tubular portion;*

*a damper supported within the hollow elongated tubular portion of the housing at a position opposite the sound outlet port of the receiver, sound from the sound outlet port of the receiver being conducted to the damper by the hollow elongated tubular portion;*

*a resilient scaling member disposed over the hollow elongated tubular portion for sealing with an ear canal of a wearer; and*

*the housing extending into and substantially acoustically sealing the ear canal of the wearer when inserted such that the housing is supported by the ear of the wearer, the damper and receiver response compensating for loss of external ear resonance and coupling resonance that otherwise would occur when the insert earphone is inserted into the ear canal of the wearer to thereby assist in providing a high fidelity response without requiring a long flexible tube between the hollow elongated tubular portion of the housing and the resilient sealing member.*

*32. The insert earphone of claim 31 wherein the sound outlet portion extending partially into the hollow elongated tubular portion directly contacts a surface of the hollow elongated tubular portion.*

*33. The high fidelity insert earphone of claim 31 wherein the resilient sealing member has a plurality of outwardly projecting flange portions of generally conical form and of progressively increasing diameters.*

*34. An insert earphone comprising:*

*a housing having a hollow body portion, the hollow body portion having an end wall and a hollow elongated tubular portion extending from the end wall;*

*a cable including a plurality of electrical conductors extending from an electrical audio signal source external to the housing;*

*a receiver electrically coupled to the plurality of electrical conductors, the receiver for transducing electrical energy received along the plurality of electrical conductors to sound energy, the receiver being supported within the hollow body portion of the housing and having a sound outlet port extending partially into the hollow elongated tubular portion of the housing in a closely conforming manner;*

*an insert formed from a resilient material, the insert being disposed between the receiver and at least one interior wall of the housing;*

*a damper supported within the hollow elongated tubular portion of the housing at a position opposite the sound outlet port of the receiver, sound from the sound outlet port of the receiver being conducted to the damper by the hollow elongated tubular portion;*

*a resilient sealing member disposed over the hollow elongated tubular portion for sealing with an ear canal of a wearer; and*

*the housing extending into and substantially acoustically sealing the ear canal of the wearer when inserted such that the housing is supported by the ear of the wearer, the damper and receiver response compensating for loss of external ear resonance and coupling resonance that otherwise would occur when the insert earphone is inserted into the ear canal of the wearer to thereby assist in providing a high fidelity response without requiring a long flexible tube between the hollow elongated tubular portion of the housing and the resilient sealing member.*

*35. The insert earphone of claim 34 wherein the sound outlet port extending partially into the hollow elongated tubular portion directly contacts a surface of the hollow elongated tubular portion.*

*36. The high fidelity insert earphone of claim 34 wherein the resilient sealing member has a plurality of outwardly projecting flange portions of generally conical form and of progressively increasing diameters.*

*37. The insert earphone of claim 34 wherein the insert inhibits movement of the receiver within the hollow body portion.*

*38. The insert earphone of claim 34 wherein the insert assists in providing an acoustical seal between the hollow body portion and the elongated tubular portion.*

*39. An insert earphone comprising:*

*a housing having a hollow body portion, the hollow body portion having an end wall and a hollow elongated tubular portion extending from the end wall;*

*a filter electrically coupled to an electrical audio signal source external to the housing, the filter for receiving electrical signals from the audio signal source and for modifying frequency components of the electrical signals received;*

*a receiver electrically coupled to an output of the filter, the receiver for transducing electrical received from the filter to sound energy, the receiver being supported within the hollow body portion of the housing and having a sound outlet port extending partially into the hollow elongated tubular portion of the housing in a closely conforming manner;*

*an insert formed from a resilient material, the insert being disposed between the receiver and at least one interior wall of the housing;*

*a damper supported within the hollow elongated tubular portion of the housing at a position opposite the sound outlet port of the receiver, sound from the sound outlet port of the receiver being conducted to the damper by the hollow elongated tubular portion;*

*a resilient sealing member disposed over the hollow elongated tubular portion for sealing with an ear canal of a wearer; and*

*the housing extending into and substantially acoustically sealing the ear canal of the wearer when inserted such that the housing is supported by the ear of the wearer, the damper and receiver response compensating for loss of external ear resonance and coupling resonance that otherwise would occur when the insert earphone is*

*inserted into the ear canal of the wearer to thereby assist in providing a high fidelity response without requiring a long flexible tube between the hollow elongated tubular portion of the housing and the resilient sealing member.*

*40. The insert earphone of claim 39 wherein the sound outlet port extending partially into the hollow elongated tubular portion directly contacts a surface of the hollow elongated tubular portion.*

*41. The insert earphone of claim 39 wherein the earphone emulates a human ear's natural diffuse field response to sound energy received.*

*42. The high fidelity insert earphone of claim 39 wherein the resilient sealing member has a plurality of outwardly projecting flange portions of generally conical form and of progressively increasing diameters.*

*43. The insert earphone of claim 39 wherein the insert inhibits movement of the receiver within the hollow body portion.*

*44. The insert earphone of claim 39 wherein the insert assists in providing an acoustical seal between the hollow body portion and the elongated tubular portion.*

*45. The insert earphone of claim 39 wherein modifying frequency components of the electrical signals received comprises increasing high frequency components of the electrical signals received.*

*46. The insert earphone of claim 39 wherein the filter is located in a junction unit external to the housing.*

*47. The insert earphone of claim 39 wherein the filter is located in the housing.*

*48. An insert earphone comprising:*

*a housing having a hollow body portion, the hollow body portion having an end wall and a hollow elongated tubular portion extending from the end wall;*

*a cable including a plurality of electrical conductors extending from an electrical audio signal source external to the housing;*

*a receiver electrically coupled to the plurality of electrical conductors, the receiver for transducing electrical energy received along the plurality of electrical conductors to sound energy, the receiver being supported within the hollow body portion of the housing and having a sound outlet port extending partially into the hollow elongated tubular portion of the housing in a closely conforming manner;*

*an insert formed from a resilient material, the insert being disposed between the receiver and at least one interior wall of the housing;*

*a damper;*

*a resilient sealing member disposed over the hollow elongated tubular portion for sealing with an ear canal of a wearer; and*

*the housing extending into and substantially acoustically sealing the ear canal of the wearer when inserted such that the housing is supported by the ear of the wearer, the damper and receiver response compensating for loss of external ear resonance and coupling resonance that otherwise would occur when the insert earphone is inserted into the ear canal of the wearer to thereby assist in providing a high fidelity response without requiring a long flexible tube between the hollow elongated tubular portion of the housing and the resilient sealing member.*

*49. The insert earphone of claim 48 wherein the sound outlet port extending partially into the hollow elongated tubular portion directly contacts a surface of the hollow elongated tubular portion.*

*50. The insert earphone of claim 48 wherein the earphone emulates a human ear's natural diffuse field response to sound energy received.*

*51. The high fidelity insert earphone of claim 48 wherein the resilient sealing member has a plurality of outwardly projecting flange portions of generally conical form and of progressively increasing diameters.*

*52. The insert earphone of claim 48 wherein the insert inhibits movement of the receiver within the hollow body portion.*

*53. The insert earphone of claim 48 wherein the insert assists in providing an acoustical seal between the hollow body portion and the elongated tubular portion.*

*54. The insert earphone of claim 48 wherein the damper comprises an acoustic damper.*

*55. The insert earphone of claim 48 wherein the damper is supported within the hollow elongated tubular portion of the housing.*

*56. The insert earphone of claim 55 wherein the damper is positioned opposite the sound outlet port of the receiver.*

* * * * *

UNITED STATES PATENT AND TRADEMARK OFFICE

CERTIFICATE OF CORRECTION

PATENT NO. : RE 38,351 E
DATED : December 16, 2003
INVENTOR(S) : Iseberg et al.

It is certified that error appears in the above-identified patent and that said Letters Patent is hereby corrected as shown below:

Column 1,
Line 3, insert the following:
-- More that one reissue application has been filed for the reissue of patent 5,887,070. Along with the present application, a reissue continuation application (Serial No. 10/622,224) ("the '224 application") was filed on July 18, 2003. T
+

Signed and Sealed this

Twenty-ninth Day of November, 2005

JON W. DUDAS
*Director of the United States Patent and Trademark Office*